March 10, 1953     A. J. REDLICH     2,631,076
LEG CONNECTOR FOR TABLE TOPS

Filed Sept. 8, 1949

INVENTOR.
ABRAHAM J. REDLICH.
BY
Christy, Parmelee, & Strickland
ATTORNEYS.

Patented Mar. 10, 1953

2,631,076

UNITED STATES PATENT OFFICE 2,631,076

LEG CONNECTOR FOR TABLE TOPS

Abraham J. Redlich, Pittsburgh, Pa., assignor to The Redlich Manufacturing Company, Pittsburgh, Pa., a corporation of Pennsylvania Application September 8, 1949, Serial No. 114,550

2 Claims. (Cl. 311—110)

This invention relates, as indicated, to a table leg connector, and, more particularly, to an improved connector assembly which will facilitate and expedite the connection of a table leg to a table top, and which will, in addition, provide an adjustment by which the effective length of the leg secured to the table top may be varied.

The table leg connector of this invention is primarily designed for small light tables such as end tables or dinette tables and the like. Tables of this type are commonly provided with a pair of parallel leg members which are secured to the table top at points adjacent each other to provide a vertical support for the table. Such tables are mass produced, and it is desirable that the cost of manufacture be kept as low as possible for competitive reasons.

A main item of cost in the manufacture of tables of the character referred to is the cost of making a connection between the light weight leg members and the table top. In end tables and the like, this connection has been commonly made by securing two wooden connecting members to the underside of the table top with space therebetween for the reception of the end of the table leg to be connected to the table top. The connecting members providing the space for the reception of the end of the table leg in some cases may be the molding around the lower edge surface of the table. However, in all cases, the end of the table leg is inserted in the space provided to a position with its end abutting against the undersurface of the table. Fastening members are then inserted through the connecting members and the end of the table leg to secure the table leg in position. In these structures, glue may be employed in making the necessary connections between the various parts. However, by reason of the number of parts required and the number of connections to be made, considerable time is consumed in making the connection, and the connection consequently is one of the most expensive items in the construction of the table.

One of the principal objects of this invention is to provide a table leg connector which will give an improved and adjustable connection between a table leg and a table top and which will be effective to reduce the cost of manufacture of small tables of the character referred to. To these and related ends, this invention contemplates the provision of a table leg connector constructed of sheet metal stampings as an assembly which may be secured to the underside of a table by ordinary wood screws. The assembly is such that its connection to the table top may be made by unskilled labor. The assembly includes metal plates having cooperating grooves formed therein to provide a space for the reception of the end of a table leg. A clamp is provided for forcing the metal plates together to clamp the end of a table leg in position between the metal plates and thereby secure the table leg to the assembly which operates in turn to secure the leg to the table top. Since the assembly of this invention fastens the table leg in position by a clamping action only, there is provided an adjustable connection between the leg and the assembly by which the effective length of the table leg may be readily adjusted with respect to a table top. The connector assembly is such that it may be secured to a table top in very little time and the table legs may be connected thereto quite easily. The assembly thus operates to materially reduce the cost of manufacturing tables of the character referred.

Other objects and advantages of the invention will become apparent from the following description.

In the drawings, there is shown a preferred embodiment of the invention. In this showing:

Figure 1:
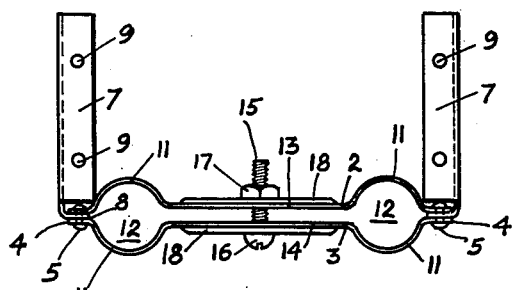
Fig. 1 is a top plan view of a connector assembly constructed in accordance with the principles of this invention.
Figure 2:
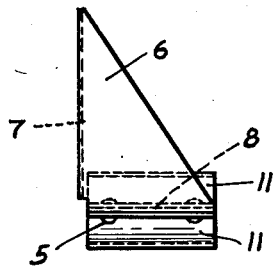
Fig. 2 is a side elevational view of the assembly shown in Fig. 1.
Figure 3:
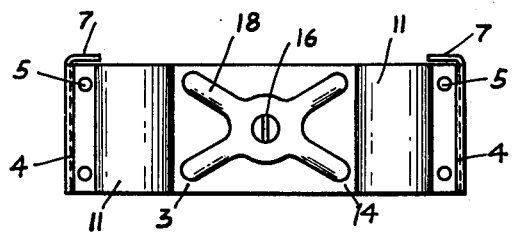
Fig. 3 is a front elevational view of the connector assembly.

As shown in the drawings, the connector assembly comprises a pair of metal plates or stampings 2 and 3 arranged in face-to-face relation, and having similar transverse edges 4 secured together as by rivets 5. Although rivets 5 are illustrated as a connecting means for the edges 4 of the assembly, it will be understood that any other suitable fastening connections may be employed for the purpose of the rivets 5.

Figure 4:
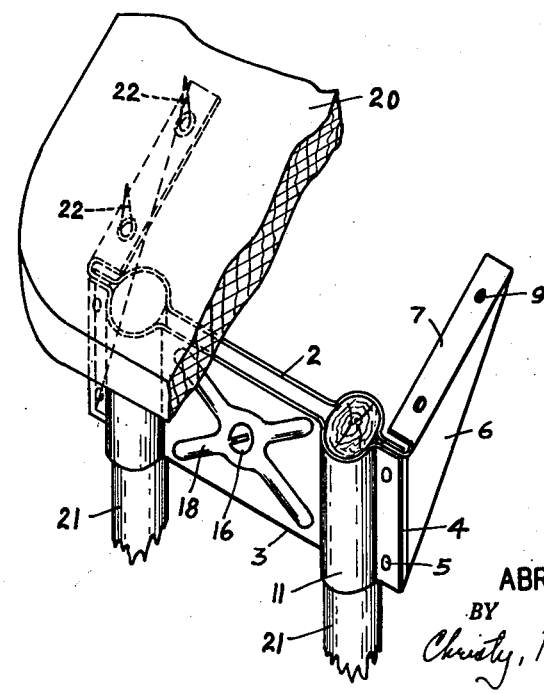
Fig. 4 is a fragmentary perspective view illustrating the manner in which the connector assembly operates to secure table legs to a table top.

Each edge 4 of the connector assembly is provided with a reinforcing and mounting bracket 6. Each mounting bracket 6 comprises a metal plate in the form of a triangle having flanges 7 and 8 projecting inwardly from the edges forming the legs of the triangle. The flanges 8 are positioned and clamped rigidly between the edges of the plates 2 and 3 forming the edges 4 of the assembly. The flanges 7 are provided with openings 9 through which screws may be passed for securing the assembly to the underside of a table top as shown in Fig. 4. When thus secured in position, the brackets 6 operate to prevent angular movement of the plates 2 and 3 with respect to a table top in addition to connecting the plates 2 and 3 to the table top.

As best shown in Figs. 1 and 4, each of the plates 2 and 3 is provided with a semi-circular grooved portion 11 adjacent each of the edges 4. The grooved portions 11 cooperate to provide spaces 12 having a circular cross-section for the reception of the end of a table leg in a manner to be described.

The central portions of the plates 2 and 3 between the grooved portions 11, indicated respectively by the numerals 13 and 14, are spaced from each other as best shown in Fig. 1. The parts 13 and 14 are provided with aligned openings for the reception of a threaded fastening element 15 having a screw head 16 and a nut 17 threaded on its shank. Upon turning movement of the nut 17 relative to the fastening element 15, the parts 13 and 14 will be flexed toward each other to decrease the space 12 and thereby clamp the end of the leg between the grooved portions 11 to secure the leg to the assembly. In order to make the central portions 13 and 14 more rigid, and to increase the resiliency resisting movement of the central portions 13 and 14 toward each other, the central portions 13 and 14 are upset generally in the form of a cross as indicated by the numeral 18.

The operation of the connector assembly in the manufacture of a table end in forming a connection between the table top and supporting legs of a table will be best understood by referring to Fig. 4. In this showing, the numeral 20 designates a table top to which a pair of supporting legs 21 are to be secured. In the manufacture of the table, the connector assembly is secured to the underside of the table by wood screws 22 which are inserted through openings 9 to clamp the flanges 7 tight against the undersurface of the table top 20. With the connector assembly thus secured in position, the legs 21 are inserted endwise into the cylindrical spaces 12 between the plates 2 and 3. The fastening element 15 is then rotated by a screw driver to flex the plates 2 and 3 toward each other and to apply a clamping force to the ends of the table legs 21. This clamping force operates to secure the legs 21 to the connector assembly. Since the legs 21 are secured to the assembly by clamping action, it will be seen that the axial position of the legs 21 in the assembly may be readily adjusted to thereby vary the effective length of the legs 21.

Attention is particularly directed to the fact that the connector assembly is constructed of sheet metal stampings and may be produced by inexpensive manufacturing operations. After the connector assemblies have been manufactured, they may be secured to the underside of a table very rapidly. The time required to secure the connector assembly to the underside of a table is no more than that which is required to drive four screws, such as the screws 22 into position. With the connector assembly mounted in position on the underside of a table, it is merely necessary to move the ends of the legs 21 into an operative position in the spaces 12 between the plates 2 and 3 and to operate the clamping device 15 to secure the legs to the connector assembly. With the legs 21 secured to the connector assembly, they are effectively secured to the table top for which they are to form a support. It will be apparent that these operations may be performed in a minimum of time and at a minimum of expense in the manufacture of a table. It will also be apparent that the parts employed in making the connection may be manufactured from inexpensive materials by inexpensive manufacturing operations. It will thus be seen that the connector assembly of this invention provides a considerable reduction in the cost of manufacturing tables as compared to tables provided with conventional connecting devices and assembled by conventional manufacturing methods.

While I have illustrated and described one specific embodiment of my invention, it will be understood that this is merely by way of illustration, and that various changes and modifications may be made therein within the contemplation of my invention and under the scope of the following claims.

I claim:

1. A table leg connector comprising a pair of spaced sheet metal brackets of triangular shape respectively having a horizontal edge with a flange projecting therefrom for connection to the underside of a table and a vertical edge extending downwardly from said horizontal edge, each of said brackets having an inwardly turned flange extending along its said vertical edge, and an assembly structure connecting said vertical edges for maintaining said brackets in spaced parallel relation comprising a pair of sheet metal plates in face-to-face relationship with similar side edges secured together and connected with said bracket vertical edges, the connected side edges of said plates having clamping engagement with one of said inwardly turned flanges positioned therebetween, the portions of said plates between said side edges being spaced slightly from each other so that said plates may resiliently flex toward each other in response to a clamping force applied thereto at a point between said side edges, each of said plates having a semi-circular groove adjacent each of said edges, each groove on one of said plates cooperating with a similar groove on another of said plates to provide a space for the reception of a table leg end, and a clamp between said grooves for applying a clamping force to said plates to clamp the ends of table legs in said spaces and thereby secure such table legs to said connector.

2. A table leg connector comprising a vertically extending sheet metal clamp having vertical side edges and a pair of semi-circular grooves respectively positioned adjacent and parallel to one of said side edges, said clamp having a substantially flat and resilient center portion between said grooves, a pair of parallel and vertical sheet metal bracing plates respectively having a rigid connection with one of said clamp side edges and extending perpendicular to the plane of said clamp, each of said bracing plates having a horizontal flange along its top edge for connection to the underside of a table, and a second sheet metal clamp confronting with and having a contour similar to said first clamp with its semi-circular grooves cooperating with the grooves of said first clamp to provide spaced vertical openings for the reception of the upper ends of a pair of table legs and with its center portion spaced slightly from the center portion of said first clamp, the side edges of said second clamp being secured to the similar side edges of said first clamp, and a fastener positioned midway of said openings for forcing said center portions toward each other to apply a clamping force to the ends of table legs in said openings.

ABRAHAM J. REDLICH.

REFERENCES CITED

The following references are of record in the file of this patent:

UNITED STATES PATENTS

| Number | Name | Date |
|---|---|---|
| 843,375 | Thompson | Feb. 5, 1907 |
| 1,608,184 | Rumble | Nov. 23, 1926 |
| 1,870,173 | Calton | Aug. 2, 1932 |
| 1,875,635 | Merrill | Sept. 6, 1932 |
| 2,253,172 | Fetterman | Aug. 19, 1941 |
| 2,485,784 | Shoenberg | Oct. 25, 1949 |
| 2,501,746 | Shoenberg | Mar. 28, 1950 |

FOREIGN PATENTS

| Number | Country | Date |
|---|---|---|
| 134,262 | Switzerland | Oct. 1, 1929 |
| 412,295 | Great Britain | June 28, 1934 |